United States Patent
Aurich et al.

(10) Patent No.: US 9,296,399 B2
(45) Date of Patent: Mar. 29, 2016

(54) METHOD FOR CONTROLLING A COMPRESSED-AIR BRAKING DEVICE OF A RAIL VEHICLE IN THE CASE OF AUTOMATIC, QUICK, OR EMERGENCY BRAKING

(71) Applicant: KNORR-BREMSE SYSTEME FUR SCHIENENFAHRZEUGE GMBH, Munich (DE)

(72) Inventors: Stefan Aurich, Friedberg (DE); Torsten Grunwald, Seehausen am Staffelsee (DE); Alexander Seidenschwang, Munich (DE)

(73) Assignee: KNORR-BREMSE SYSTEME FUR SCHIENENFAHRZEUGE GMBH, Munich (DE)

( * ) Notice: Subject to any disclaimer, the term of this patent is extended or adjusted under 35 U.S.C. 154(b) by 12 days.

(21) Appl. No.: 14/402,531

(22) PCT Filed: May 24, 2013

(86) PCT No.: PCT/EP2013/060708
§ 371 (c)(1),
(2) Date: Nov. 20, 2014

(87) PCT Pub. No.: WO2013/174965
PCT Pub. Date: Nov. 28, 2013

(65) Prior Publication Data
US 2015/0134157 A1 May 14, 2015

(30) Foreign Application Priority Data
May 25, 2012 (DE) .......................... 10 2012 010 519

(51) Int. Cl.
*B61H 13/00* (2006.01)
*B60T 13/66* (2006.01)
*B60T 17/22* (2006.01)

(52) U.S. Cl.
CPC .............. *B61H 13/00* (2013.01); *B60T 13/665* (2013.01); *B60T 17/228* (2013.01)

(58) Field of Classification Search
CPC ...... G05D 13/66; B60H 13/00; B60T 13/665; B60T 17/228
USPC ............................................................ 701/20
See application file for complete search history.

(56) References Cited

U.S. PATENT DOCUMENTS

| 3,472,560 A | 10/1969 | Desthuilliers |
| 3,669,134 A | 6/1972 | Dobritz |

(Continued)

FOREIGN PATENT DOCUMENTS

| DE | 2749161 | 5/1978 |
| DE | 19527419 | 2/1997 |

(Continued)

OTHER PUBLICATIONS

Search Report issued in Int'l App. No. PCT/EP2013/060708 (2014).

(Continued)

*Primary Examiner* — Helal A Algahaim
*Assistant Examiner* — Charles J. Han
(74) *Attorney, Agent, or Firm* — Barnes & Thornburg, LLP; Renee Danega

(57) ABSTRACT

A method controls a compressed-air braking device of a rail vehicle in the case of automatic, quick, or emergency braking, said compressed-air braking device having a controlled electropneumatic braking device having brake pressure control, an uncontrolled brake pressure control device for producing an uncontrolled brake pressure, and at least one pneumatic brake actuator. In response to a signal to trigger automatic, quick, or emergency braking, the controlled electropneumatic braking device and the uncontrolled brake pressure control device are activated simultaneously and a first value for the brake pressure produced by the controlled electropneumatic braking device or a first value for a pilot control pressure representing the brake pressure and a second value for the brake pressure produced by the uncontrolled brake pressure control device or a second value for a pilot control pressure representing the brake pressure are compared with each other.

18 Claims, 1 Drawing Sheet

(56) References Cited

U.S. PATENT DOCUMENTS

| | | | |
|---|---|---|---|
| 4,254,790 A | 3/1981 | Eriksson et al. | |
| 4,536,039 A | 8/1985 | Barberis | |
| 5,297,856 A * | 3/1994 | Asano | B60T 13/58 303/9.61 |
| 5,662,391 A | 9/1997 | McKay | |
| 5,671,767 A | 9/1997 | Kelly | |
| 2003/0107262 A1 | 6/2003 | Smith et al. | |
| 2004/0119331 A1 | 6/2004 | Long | |
| 2005/0162003 A1 | 7/2005 | Barberis | |
| 2007/0173990 A1 * | 7/2007 | Smith | B61C 15/14 701/20 |
| 2007/0290550 A1 * | 12/2007 | Knornschild | B60T 15/36 303/3 |

FOREIGN PATENT DOCUMENTS

| | | |
|---|---|---|
| DE | 19707207 | 8/1998 |
| DE | 19748991 | 5/1999 |
| DE | 10-2009-016986 | 10/2010 |
| DE | 10-2009-051019 | 5/2011 |
| DE | 10-2010-005091 | 7/2011 |
| DE | 10-2010-053683 | 6/2012 |
| EP | 0112625 | 7/1984 |
| EP | 0741065 | 11/1996 |
| EP | 1747132 | 11/2011 |
| GB | 519450 | 3/1940 |
| GB | 848111 | 9/1960 |
| GB | 1320692 | 6/1973 |
| GB | 2212572 | 7/1989 |
| WO | WO 86/07475 | 12/1986 |
| WO | WO 2010/003854 | 1/2010 |

OTHER PUBLICATIONS

English Translation of Notification Concerning Transmittal of International Preliminary Report on Patentability and Written Opinion of the International Search Authority for International Patent Application No. PCT/EP2013/060708, dated May 24, 2013.

* cited by examiner

METHOD FOR CONTROLLING A COMPRESSED-AIR BRAKING DEVICE OF A RAIL VEHICLE IN THE CASE OF AUTOMATIC, QUICK, OR EMERGENCY BRAKING

CROSS REFERENCE TO RELATED APPLICATIONS

This application is a U.S. nationalization under 35 U.S.C. §371 of International Application No. PCT/EP2013/060708, filed May 24, 2013, which claims priority to German Patent Application No. 10-2012-010519.3, filed May 25, 2012. The disclosures set forth in the referenced applications are incorporated herein by reference in their entireties.

FIELD

Disclosed embodiments relate to a method for controlling a compressed-air braking device of a rail vehicle, said compressed-air braking device having a regulated electropneumatic braking device with brake pressure regulation and an unregulated brake pressure control device for generating an unregulated brake pressure as well as at least one pneumatic brake actuator, in the case of automatic, rapid or emergency braking and to such a compressed-air braking device.

DESCRIPTION

The use of friction-based brakes in vehicles, in particular of disk brakes in rail vehicles, is limited by the fact that the brake disks can only take up a limited amount of energy, the brake linings are stable only up to a certain limited temperature, only a limited braking power can be applied to the brake disks and the maximum coefficient of static friction is dependent on the relative speed between the brake disk and the brake lining. Therefore, brake systems of high speed trains are as a rule embodied with at least two speed-dependent stages, wherein at relatively high speeds braking is carried out with a lower braking force than in the case of relatively low speeds, in order to avoid the brakes wearing too early or reaching load limits at relatively high speeds.

Automatic, rapid and emergency braking has to be carried out with a high safety level. For this reason, as a rule only mechanical-pneumatic components (control valve, relay valve) with a pneumatic signal path, in particular via a main air line HL or electropneumatic components with an electrical signal path formed by a safety loop are used for this purpose. No proof of safety is necessary for such components. Although graduated actuation of the brake as a function of the speed, as already described above, is possible with these components, the performance of the brake therefore cannot be fully utilized within its load limits.

An emergency braking device of a rail vehicle, which is graduated as a function of the speed, is described, for example, in the genus-forming DE 10 2009 051 019 A1. In this document, a hierarchical sequence of an emergency braking operation is illustrated, wherein an emergency braking operation is firstly carried out by interaction of a regenerative brake with an electropneumatic brake with regulation of the braking force and as a function of the speed, as a brake blending operation. In the event of a failure of the regenerative brake, the emergency braking force is carried out solely with the regulated electropneumatic brake and as a function of the speed. If the electropneumatic brake fails, the emergency braking force is controlled as a function of the speed by an additional electromagnetic emergency brake valve device. Accordingly, when the regenerative brake fails in the case of emergency braking, either the electropneumatic brake is activated, or in the event of said brake failing the additional electromagnetic emergency brake valve device is activated, but both systems are never activated together.

Compared to control of the braking forces which is graduated as a function of the speed in the case of automatic, rapid and emergency braking, continuous and infinitely variable regulation of the braking force or of the brake pressure provides the possibility of using continuous characteristic curves relating to a setpoint value dependent on the speed, for the brake pressure or for this braking force, and therefore of utilizing better both the performance of the brake within its load limit and of ensuring better approximation to normative requirements or prescriptions. However, a disadvantage of such continuous, infinitely variable regulation of the braking force or of the brake pressure is that a proof of safety is necessary, which proof is, as a rule, costly to produce and has to be repeated for every re-design of a brake.

SUMMARY

In contrast, disclosed embodiments provide a method for controlling a compressed-air braking device or a compressed-air braking device, which method or device ensures a high level of safety in an automatic, rapid or emergency braking situation at low cost.

BRIEF DESCRIPTION OF THE FIGURES

Exemplary embodiments are presented below in the drawing and explained in more detail in the following description. In the drawing.

DETAILED DESCRIPTION

Figure 1:
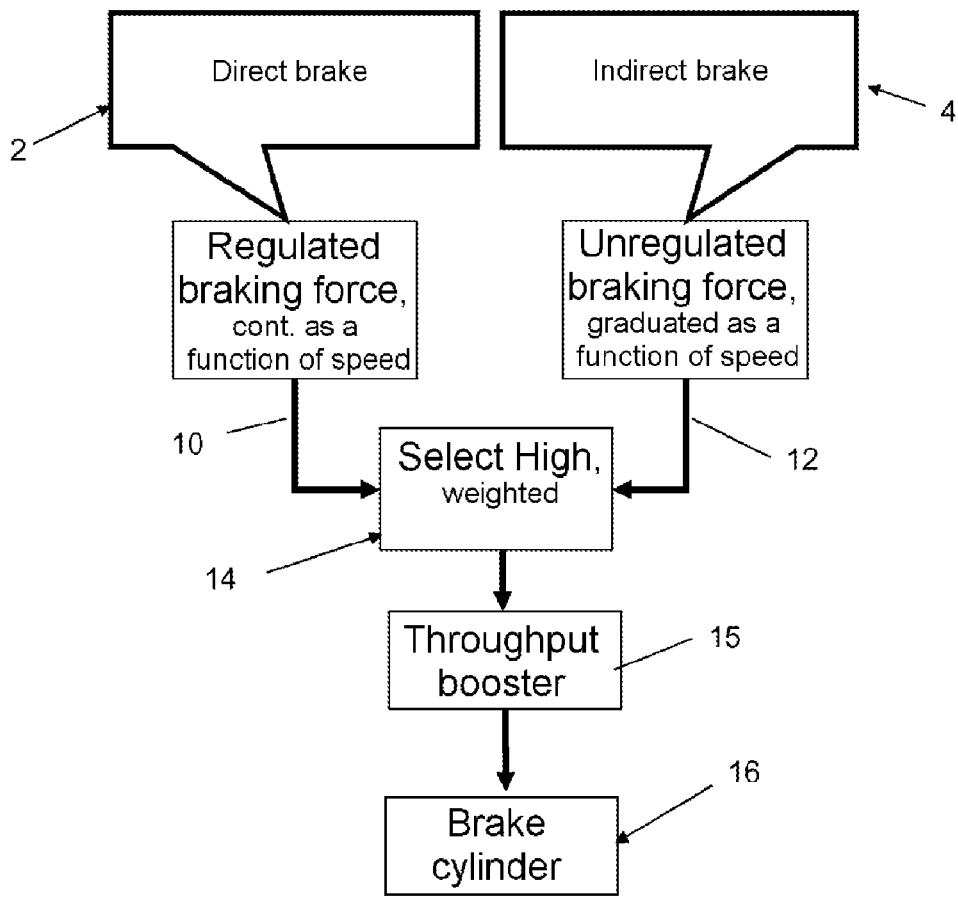
FIG. 1 shows a highly simplified diagram of an exemplary embodiment of a method for controlling a compressed-air brake system of a rail vehicle.

Disclosed embodiments provide a method that can control a compressed-air braking device of a rail vehicle, said compressed-air braking device having a regulated electropneumatic braking device with brake pressure regulation, braking force regulation or deceleration regulation and an unregulated brake pressure control device for generating a brake pressure, which is graduated as a function of the speed, as well as at least one pneumatic brake actuator, in the case of automatic, rapid or emergency braking, in which in response to a signal for triggering automatic, rapid or emergency braking a) the regulated electropneumatic braking device and the unregulated brake pressure control device are activated simultaneously or in parallel and b) a first value for the brake pressure generated by the regulated, electropneumatic braking device or a first value for a pilot-controlled pressure representing this brake pressure and a second value for the brake pressure generated by the unregulated brake pressure control device or a second value for a pilot-controlled pressure representing this brake pressure are compared, wherein this comparison is carried out by applying the first value and the second value to mechanical components of an exclusively pneumatic-mechanical comparison device, and c) as a function of this comparison a brake pressure on the basis of exclusively the first value or exclusively on the basis of the second value or on the basis of the first value and the second value is applied to the at least one pneumatic brake actuator.

A "comparison of the first value with the second value" is to be understood as meaning that the first value and the second value are placed in a relative relationship with one another without absolute values such as, for example, absolute brake pressure values necessarily being determined for this purpose.

This comparison is carried out by applying the first value and the second value to mechanical components of an exclusively pneumatic-mechanical comparison device" is to be understood as meaning that exclusively pneumatic signals in the form of the first value and/or the second value are used to act on exclusively mechanical components such as, for example, a movable valve body of an alternating check valve or a double non-return valve, in order to supply a result of the comparison such as, for example, activation of the respective higher value of the first and second values ("select-high") or of the respective lower value of first and second values ("select-low") or else re-forming a value which includes the first and the second values, for example by adding or subtracting or by means of a ratio between the first and second values. For this purpose, for example active faces of the valve body of an alternating check valve can be correspondingly prepared in terms of their size. In this case, the comparison of the first value with the second value is made, for example, on the basis of the size of the active faces of the valve body which is loaded in opposing fashions by the first value and the second value.

In particular, no electrical or electronic components are to be involved in the comparison of the first value with the second value, in order to avoid proof of safety for the electronic or electronic components. Since no proof of safety has to be provided for such purely pneumatic-mechanical means, the method can be carried out with comparatively low implementation expenditure.

Characteristic curves in which the dependence of a setpoint value for the brake pressure, for the pilot-controlled pressure or for the braking force, dependent on the speed of the rail vehicle, is saved, may be stored in a memory of a control device of the regulated electropneumatic braking device. The speed-dependent adaptation of the braking force in order to avoid wear, as mentioned at the beginning, can therefore be carried out in a continuous fashion.

In an analogous fashion, the unregulated brake pressure control device may be configured to generate a brake pressure or pilot-controlled pressure which is graduated as a function of the speed. This means that the value of the modulated brake pressure or pilot-controlled pressure changes in a graduated fashion as a function of the speed. The speed-dependent adaptation of the braking force mentioned at the beginning for the avoidance of wear can therefore be carried out in a graduated fashion if not continuously.

In particular, in the pneumatic-mechanical comparison device, a weighted maximum selection (weighted "select high") takes place between the first value and the second value. As long as, for example, the first value is below the second value by not more than a predefined fraction, the brake pressure may be formed by the first value and, otherwise by the second value and applied to the at least one pneumatic brake actuator. In this context, the predefined fraction is approximately 30%.

For example an alternating check valve, a double non-return valve or a relay valve is used as the mechanical-pneumatic device and they constitute together pneumatic-mechanical means, which do not require electrical or electronic means to be able to carry out the comparison between the first value and the second value. The first value and the second value are then each present at an input terminal of the mechanical-pneumatic components mentioned above and load active faces of pistons or valve bodies, for example in opposing fashions.

According to one development, the unregulated brake pressure control device is a known indirect brake which generates an unregulated brake pressure or an unregulated pilot-controlled pressure as a second value as a function of a main air line pressure in a main air line HL. In this context, the main air line pressure can be influenced electropneumatically by a control valve device which contains a braking solenoid valve and a release solenoid valve.

In contrast, the regulated electropneumatic braking device may be a known direct electropneumatic braking device having an electropneumatic brake pressure regulator which generates a regulated brake pressure or a regulated pilot-controlled pressure as a first value using a braking solenoid valve, a release solenoid valve, a pressure sensor and an electronic control device on the basis of a main air vessel line pressure conducted in a main air vessel line HB.

Disclosed embodiments also relate to a compressed-air braking device of a rail vehicle containing a regulated electropneumatic braking device with brake pressure regulation, an unregulated brake pressure control device for generating an unregulated brake pressure, a controller for controlling the braking devices, at least one pneumatic brake actuator and signal means acting together with the controller at least for generating a signal for triggering automatic, rapid or emergency braking, wherein the controller is configured in such a way that in response to a signal, modulated by the signal means, for triggering automatic, rapid or emergency braking, said controller activates simultaneously the regulated electropneumatic braking device and the unregulated brake pressure control device.

Within this context, an exclusively pneumatic-mechanical comparison device is provided by which a first value for the brake pressure generated by the regulated electropneumatic braking device or a first value for a pilot-controlled pressure representing this brake pressure and a second value for the brake pressure generated by the unregulated brake pressure control device or a second value for a pilot-controlled pressure representing this brake pressure are compared with one another, wherein this comparison is carried out by applying the first value and the second value to mechanical components of the exclusively pneumatic-mechanical comparison device.

The pneumatic-mechanical comparison device is also in this context embodied in such a way that as a function of this comparison it generates a brake pressure for the at least one pneumatic brake actuator or a pilot-controlled pressure representing this brake pressure, on the basis of exclusively the first value or exclusively on the basis of the second value or on the basis of the first value and the second value.

According to one development, a throughput booster, for example in the form of a relay valve, is connected between the mechanical-pneumatic comparison device and the at least one brake actuator.

Last but not least, the signal means for generating the signal for triggering automatic, rapid or emergency braking can contain at least one electrical safety loop.

Further measures which improve the disclosed embodiments are presented in more detail below together with the description of an exemplary embodiment on the basis of the drawing.

FIG. 1 shows a highly simplified diagram of an exemplary embodiment of a method for controlling a compressed-air braking device of a rail vehicle or of a train formed from a plurality of rail vehicles, which compressed-air braking device contains an electropneumatic braking device ("direct brake") 2 which acts directly and is regulated as a function of brake pressure, and an indirectly acting brake with unregulated brake pressure control ("indirect brake") 4. The structure of the direct brake 2 and of the indirect brake 4 are explained briefly below.

A main air vessel line HB, which is supplied by a compressed air source, for example a compressor, with compressed air under main air vessel line pressure, is made to extend through the rail vehicle or through the train. The main air vessel line HB supplies the direct brake 2 and the indirect brake 4 with compressed air. Furthermore, a main air line HL which is controlled by a driver brake valve and which serves to control the indirect brake 4 is present.

The direct brake 2 has an electropneumatic pressure regulator in which the electrical commands which are predefined by control electronics of a brake control device via signal lines are converted into pneumatic signals, in particular into a pilot-controlled pressure for a relay valve connected downstream or a unit pressure converter. The electropneumatic pressure regulator is formed by a braking solenoid valve, a release solenoid valve, by a pressure sensor and by the electronic brake control device. The braking solenoid valve and the release solenoid valve assume here the function of the infinitely variable and rapid pressure build up or pressure reduction. The pressure sensor serves to measure the applied pilot-controlled pressure. The electropneumatic pressure regulator forms, together with the electronic brake control device, a pressure regulating circuit in which a pilot-controlled pressure for the relay valve is applied. The brake pressure for at least one pneumatic brake cylinder as a brake actuator is then generated by the relay valve as a function of the regulated pilot-controlled pressure. Furthermore, the relay valve can form the brake pressure as a function of the load and also as a function of the speed. The brake pressure is therefore formed with continuous and infinitely variable regulation by means of the direct brake 2. Such a direct brake 2 is known per se, for example from DE 10 2009 051 019 A1, which was discussed at the beginning. More details will therefore not be given on this here.

The direct brake 2 is used, inter alia, in service braking operations for assisting a prioritized electrodynamic brake, and serves also as a redundant fallback level in the event of failure of the electrodynamic brake. The direct brake 2, however, may also be used for automatic, emergency or rapid braking operations, as will be shown later below.

According to the diagram 6 (shown in FIG. 2) for the direct brake 2, characteristic curves in which the dependence of a setpoint value for the braking force F or the brake pressure or pilot-controlled pressure, dependent on the speed v of the rail vehicle, is saved, are stored in a memory of the electronic brake control device of the direct brake 2. As a result, a speed-dependent adaptation of the braking force F or of the brake pressure or pilot-controlled pressure in order to avoid wear is carried out in a continuous fashion. In the present case, for example the braking force F and therefore the setpoint pilot-controlled pressure of the direct brake 2 within the context of brake pressure regulation is continuously reduced from a speed $v_{limit1}$, starting from a constant speed value in a speed range $0<v<v_{limit1}$.

The indirect brake 4 is used mainly for automatic, emergency and rapid braking operations. In every driver's cab, the driver has at his disposal a drivers braking valve for activating the indirect brake 4. By means of the driver's braking valve, the driver can vent the main air line HL in an infinitely variable fashion, and therefore lower the pressure of 5 bar (release pressure). Given a reduction by 1.5 bar, the maximum braking stage is reached. A further pressure reduction has no further effect. Given automatic, rapid or emergency braking, the main air line HL is suddenly vented in order to shorten the braking and response times. In this context, the pressure in the main air line HL is lowered by activating an emergency switching button in the drivers cab and resultant opening of an electrical safety loop, and therefore the automatic, rapid or emergency braking for the indirect brake 4 is triggered. The main air line pressure which transports the braking commands and release commands of the tractive unit driver is converted into a pilot-controlled pressure or the brake cylinder pressure in the individual cars by means of a control valve. A drop in main air line pressure (in the range between release pressure of 5 bar and the pressure of the maximum braking stage) brings about here a rise in brake pressure or pilot-controlled pressure. This known indirect brake 4 can be supplemented by an electric actuation device. The electrical control signals for the control valve device are generated in the driving vehicle parallel to the main air line pressure in the main air line HL and transmitted into all the rail vehicles of the train via electrical lines. As a result, simultaneous actuation of the control valve devices of the indirect brakes of all the rail vehicles of the train configuration is achieved. In this case, the control valve contains a release solenoid valve and a braking solenoid valve.

As in the case of the direct brake 2, the pilot-controlled pressure of the indirect brake 4 can also be applied to a relay valve. Furthermore, the relay valve may be configured in such a way that it controls the brake pressure as a function of the speed in at least two stages, wherein at relatively high speeds braking is performed with a lower brake pressure than at relatively low speeds.

Figure 2:
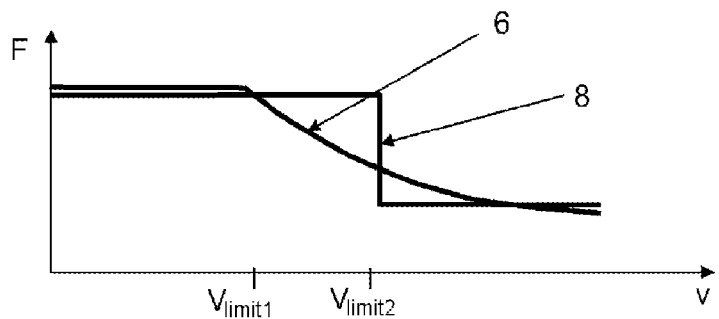
FIG. 2 shows a diagram of the braking force F as a function of the speed of the rail vehicle.

This fact is shown in FIG. 2 by means of the diagram 8 for the indirect brake 4, wherein the brake pressure which is modulated by the indirect brake 4, and therefore the braking force F is constant for a speed range $0<v<v_{limit2}$, and is then reduced in a graduated fashion from the speed $v_{limit2}$. The braking force F or the brake pressure is therefore controlled as a function of the speed v, for example in two stages here. Of course, more than two stages are also conceivable.

Instead of an indirect brake 4, a simple emergency brake valve device such as is described, for example, in DE 10 2009 051 019 A1 discussed at the beginning, can also be used to generate a controlled brake pressure or controlled pilot-controlled pressure by means of an emergency brake valve controlled by the safety loop, which pressure is then optionally also graduated as a function of the speed. This brake pressure or pilot-controlled pressure can be derived, for example, from a reservoir pressure of a pressure reservoir such as a main air vessel line HB and limited to a specific pressure value by a pressure-limiting valve. In general, any unregulated brake circuit which modulates an unregulated brake pressure or an unregulated pilot-controlled pressure, and which can also optionally be graduated as a function of the speed, is compatible.

More detailed descriptions are given below of the method for controlling the compressed-air brake device in the event of automatic, rapid or emergency braking (illustrated in schematic form in FIG. 1) or the compressed-air braking device itself. In response to a signal, generated, for example, by means of the electrical safety loop, for triggering the automatic, rapid or emergency braking, which signal is applied to a controller (not illustrated there for reasons of scale) of the compressed-air braking device, the direct brake 2 and the indirect brake 4 are firstly simultaneously activated by the controller.

In this context, a first value 10 for the brake pressure generated by the direct brake 2 or a first value 10 for a pilot-controlled pressure representing this brake pressure and a second value 12 for the brake pressure generated by the indirect brake or a second value 12 for a pilot-controlled pressure representing this brake pressure are compared with one another by the pneumatic-mechanical comparison device 14, wherein this comparison is carried out by applying the first value 10 and the second value 12 in opposing fashions to, for example, active faces of a movable valve body of an alternating check valve or double non-return valve 14. In such an alternating check valve or double non-return valve 14, the active faces of the movable valve body are loaded by the pressures present at the two inputs, here the first value 10 and the second value 12, and one of the two pressures is activated at the output of the alternating check valve as a function of shifting of the valve body.

For example, the one input of the alternating check valve 14 is connected to the direct brake 2 for applying the first value 10, the other input of the alternating check valve 14 is connected to the indirect brake 4 for applying the second value 14, and the output of the alternating check valve 14 is connected to at least one brake cylinder 16 for modulating the brake pressure, or to a brake pressure or to a throughput booster 15 in order to apply a corresponding brake pressure to the brake cylinder 16 on the basis of a pilot-controlled pressure which is present at the output of the alternating check valve 14.

If the two pressure of the indirect brake and of the direct brake are formed as pilot-controlled pressures, which is technically appropriate in order to make available sufficient working air pressure to the brake cylinder 16 which is connected downstream, a throughput booster, potentially in the form of a relay valve 15, may be arranged between the output of the alternating check valve 14 and the brake cylinder 16.

A person skilled in the art is sufficiently aware of the method of action of such an alternating check valve or double non-return valve 14 which has various pressure values at its input ports. Therefore, more details will not be given on this. The first value 10 and the second value 12 are each to be different from zero here, because both brakes, the direct brake 2 and the indirect brake 4 are activated in the case of automatic, safety or emergency braking.

The alternating check valve or double non-return valve 14 can be configured here in such a way that it modulates the higher value of the first value and of the second value as a brake pressure at its output and therefore at the at least one pneumatic brake cylinder ("select high"). In this context, a maximum selection is made between the first value 10 and the second value 12, and is applied further as a pilot-control pressure to the relay valve 15, which then generates the brake cylinder pressure for the brake cylinder 16.

Furthermore, the alternating check valve 14 may be configured here in such a way that it makes a weighted maximum selection between the first value 10 and the second value 12. In this context, for example as long as the first value 10 is below the second value 12 by not more than a predefined fraction, the brake pressure which is modulated at the output of the alternating check valve is formed by the first value 10 and, otherwise, by the second value 12. The predefined fraction is, for example, approximately 30%. In the present case, the direct brake is therefore prioritized because according to FIG. 2 it continuously adapts the setpoint value for the braking force or for the brake pressure or for the pilot-controlled pressure as a function of the speed, and the indirect brake is used only if the brake pressure or pilot-controlled pressure generated by the direct brake is too low.

The weighted maximum selection can be implemented, for example, by virtue of the fact that the valve body of the alternating check valve is prestressed in one direction by a spring prestressing and/or the active faces of the valve body for the first value and the second value are of different sizes.

According to a further embodiment, instead of an alternating check valve 14 it could be possible to use another mechanical-pneumatic comparison device which forms, from the first value and second value present at its inputs, a brake pressure for the at least one brake cylinder 16 or pilot-controlled pressure for the throughput booster 15 which is generated on the basis of both values. That is to say a first value 10 or second value 12 which is different from zero is included in each case in the brake pressure or in the pilot-controlled pressure, for example by adding the two values or by subtracting them. Any procedure for connecting the two values 10, 12 to one another or placing them in relationship with one another is permitted here.

LIST OF REFERENCE NUMERALS

2 Direct brake
4 Indirect brake
6 Diagram
8 Diagram
10 First value
12 Second value
14 Alternating check valve
15 Throughput booster
16 Brake cylinder

The invention claimed is:

1. A method for controlling a compressed-air braking device of a rail vehicle, the compressed-air braking device having a regulated electropneumatic braking device with brake pressure regulation and an unregulated brake pressure control device for generating an unregulated brake pressure as well as at least one pneumatic brake actuator, the method comprising, in response to a signal for triggering automatic, rapid or emergency braking:

simultaneously activating the regulated electropneumatic braking device and the unregulated brake pressure control device; and comparing a first value for the brake pressure generated by the regulated, electropneumatic braking device or a first value for a pilot-controlled pressure representing this brake pressure and a second value for the brake pressure generated by the unregulated brake pressure control device or a second value for a pilot-controlled pressure representing this brake pressure with one another, wherein this comparison is carried out by applying the first value and the second value to mechanical components of an exclusively pneumatic-mechanical comparison device, and based on that comparison, applying a brake pressure to the at least one pneumatic brake actuator based exclusively on the first value, based exclusively on the second value, or based on the first value and the second value, wherein, as long as the first value is below the second value by not more than a predefined threshold, the brake pressure or a pilot-controlled pressure which represents the brake pressure is formed by the first value, and otherwise is formed by the second value.

2. The method of claim 1, further comprising saving characteristic curves in which the dependence of a setpoint value for the brake pressure or for the braking force, dependent on the speed of the rail vehicle stored in a memory of a control device of the regulated electropneumatic braking device.

3. The method of claim 1, further comprising configuring the unregulated brake pressure control device to generate a brake pressure which is graduated as a function of the speed.

4. The method of claim 1, wherein the predefined threshold is approximately 30%.

5. The method of claim 1, wherein, at least one alternating check value is used as a mechanical-pneumatic comparison device.

6. The method of claim 1, wherein the unregulated brake pressure control device is an indirect brake which generates an unregulated brake pressure or an unregulated pilot-controlled pressure as a second value as a function of a main air line pressure in a main air line (HL).

7. The method of claim 1, wherein the regulated electropneumatic braking device is a direct electropneumatic braking device having an electropneumatic pressure regulator which generates a regulated brake pressure or a regulated pilot-controlled pressure as a first value using a braking solenoid valve, a release solenoid valve, a pressure sensor and an electronic control device on the basis of a main air vessel line pressure conducted in a main air vessel line (HB).

8. The method of claim 1, further comprising modulating the signal for triggering automatic, rapid or emergency braking using an electrical safety loop.

9. The method of claim 1, wherein on the basis of exclusively the first value or exclusively on the basis of the second value or on the basis of the first value and the second value a pilot-controlled pressure is applied to a throughput booster, from which the throughput booster forms the brake pressure for the brake actuator which is arranged downstream of the throughput booster.

10. A compressed-air braking device of a rail vehicle comprising:
  a regulated electropneumatic braking device with brake pressure regulation;
  an unregulated brake pressure control device that generates an unregulated brake pressure;
  a controller that controls the braking devices, at least one pneumatic brake actuator and signal means acting together with the controller at least for generating a signal for triggering automatic, rapid or emergency braking, wherein the controller is configured such that, in response to a signal, modulated by the signal means, for triggering automatic, rapid or emergency braking, the controller simultaneously activates the regulated electropneumatic braking device and the unregulated brake pressure control device;
  an exclusively pneumatic-mechanical comparison device which compares a first value for the brake pressure generated by the regulated electropneumatic braking device, a first value for a pilot-controlled pressure representing this brake pressure and a second value for the brake pressure generated by the unregulated brake pressure control device or a second value for a pilot-controlled pressure representing this brake pressure with one another,
  wherein this comparison is carried out by applying the first value and the second value to mechanical components of the exclusively pneumatic-mechanical comparison device, and
  wherein the pneumatic-mechanical comparison device generates a brake pressure for the at least one pneumatic brake actuator or a pilot-controlled pressure representing this brake pressure, based exclusively on the first value, based exclusively on the second value or based on the first value and the second value,
  wherein the mechanical-pneumatic comparison device is configured such that, as long as the first value is below the second value by not more than a predefined threshold, the brake pressure or the pilot-controlled pressure which represents the brake pressure is formed by the first value, and otherwise is formed by the second value.

11. The compressed-air braking device of claim 10, wherein the mechanical-pneumatic comparison device contains at least one alternating check valve.

12. The compressed-air braking device of claim 10, further comprising a throughput booster is connected between the mechanical-pneumatic comparison device and the at least one brake actuator.

13. The compressed-air braking device of claim 10, wherein the unregulated brake pressure control device is configured to generate a brake pressure which is graduated as a function of the speed.

14. The compressed-air braking device of claim 10, further comprising a memory, wherein characteristic curves in which the dependence of a setpoint value for the brake pressure or for the braking force, dependent on the speed of the rail vehicle are stored in the memory of a control device of the regulated electropneumatic braking device.

15. The compressed-air braking device of claim 10, wherein the predefined threshold is approximately 30%.

16. The compressed-air braking device of claim 10, wherein the unregulated brake pressure control device is an indirect brake which generates an unregulated brake pressure or unregulated pilot-controlled pressure as a second value as a function of a main air line pressure in a main air line (HL).

17. The compressed-air braking device as claimed in claim 10, wherein the regulated electropneumatic braking device is a direct electropneumatic braking device having an electropneumatic pressure regulator which generates a regulated brake pressure or a regulated pilot-controlled pressure as a first value using a braking solenoid valve, a release solenoid valve, a pressure sensor and an electronic control device on the basis of a main air vessel line pressure conducted in a main air vessel line (HB).

18. The compressed-air braking device of claim 10, wherein the signal means for generating the signal for triggering automatic, rapid or emergency braking contain at least one electrical safety loop.

* * * * *